(12) United States Patent
Ni et al.

(10) Patent No.: US 12,730,311 B2
(45) Date of Patent: Sep. 8, 2026

(54) DIFFRACTIVE OPTICAL WAVEGUIDE DISPLAY APPARATUS

(71) Applicant: NANCHANG VIRTUAL REALITY RESEARCH INSTITUTE CO., LTD., Jiangxi (CN)

(72) Inventors: Mingli Ni, Nanchang (CN); Zhixian Tan, Nanchang (CN); Jianjun Li, Nanchang (CN)

(73) Assignee: NANCHANG VIRTUAL REALITY RESEARCH INSTITUTE CO., LTD., Nanchang (CN)

( * ) Notice: Subject to any disclaimer, the term of this patent is extended or adjusted under 35 U.S.C. 154(b) by 232 days.

(21) Appl. No.: 18/726,610

(22) PCT Filed: Oct. 22, 2022

(86) PCT No.: PCT/CN2022/126856

§ 371 (c)(1),
(2) Date: Jul. 3, 2024

(87) PCT Pub. No.: WO2023/130806

PCT Pub. Date: Jul. 13, 2023

(65) Prior Publication Data

US 2026/0169287 A1 Jun. 18, 2026

(30) Foreign Application Priority Data

Jan. 4, 2022 (CN) ......................... 202210000607.4

(51) Int. Cl.
*G02B 27/01* (2006.01)
*G02B 5/18* (2006.01)
*G02B 5/30* (2006.01)

(52) U.S. Cl.
CPC ....... *G02B 27/0101* (2013.01); *G02B 5/1809* (2013.01); *G02B 5/1833* (2013.01); *G02B 5/3008* (2013.01); *G02B 2027/0118* (2013.01)

(58) Field of Classification Search
CPC ........................... G02F 1/1334; G02B 5/1833
See application file for complete search history.

(56) References Cited

U.S. PATENT DOCUMENTS 6,821,457 B1 * 11/2004 Natarajan ........... G02F 1/13342 252/582
2002/0097355 A1 7/2002 Kralik et al.
2021/0011290 A1 * 1/2021 Maimone ............. G02B 6/0035

FOREIGN PATENT DOCUMENTS

CN 104460079 A 3/2015
CN 107966819 A 4/2018
(Continued)

OTHER PUBLICATIONS

International Search Report issued on Dec. 12, 2022, in corresponding International Patent Application No. PCT/CN2022/126856, 7 pages.

*Primary Examiner* — Alexander P Gross
(74) *Attorney, Agent, or Firm* — Che-Yang Chen

(57) ABSTRACT

A diffractive optical waveguide display apparatus including a diffraction grating, where the diffraction grating is provided with a waveguide sheet on one side, and the diffraction grating is provided with an image source on the other side. A beam emitted by the image source passes through the diffraction grating and enters the waveguide sheet. The diffraction grating includes periodically distributed liquid crystal microcapsules, the liquid crystal microcapsules are hollow spheres with an inner diameter of 10 nm-60 nm and a surface thickness of 5 nm-30 nm, and the liquid crystal microcapsules are used to increase diffraction efficiencies for s-polarized light and p-polarized light, so that both the
(Continued)

s-polarized light and the p-polarized light are able to undergo total internal reflection within the waveguide sheet, thereby improving clarity of an image output by the waveguide sheet.

10 Claims, 2 Drawing Sheets

(56) References Cited

FOREIGN PATENT DOCUMENTS

| | | | | |
|---|---|---|---|---|
| CN | 110515209 A | 11/2019 | | |
| CN | 111158153 A | 5/2020 | | |
| CN | 212111991 U | 12/2020 | | |
| CN | 112444970 A | 3/2021 | | |
| CN | 114002849 A | 2/2022 | | |
| WO | WO-0248802 A1 * | 6/2002 | ......... | G02F 1/13342 |

* cited by examiner

DIFFRACTIVE OPTICAL WAVEGUIDE DISPLAY APPARATUS

This application claims priority to Chinese Patent Application No. 202210000607.4, filed with the China National Intellectual Property Administration on Jan. 4, 2022 and entitled "DIFFRACTIVE OPTICAL WAVEGUIDE DISPLAY APPARATUS", which is incorporated herein by reference in its entirety.

TECHNICAL FIELD

The present invention pertains to the field of AR optical waveguide display, and specifically relates to a diffractive optical waveguide display apparatus.

BACKGROUND

Optical waveguide display technology is an important development direction in the AR field. The volume holographic grating is generally prepared through holographic exposure of a photosensitive material using a coherent laser. Due to the advantages such as high diffraction efficiency, low cost, and ease of mass production, the volume holographic grating is expected to be applied in optical waveguide-based AR display using the volume holographic grating. The polymer-dispersed liquid crystal volume holographic grating is a volume holographic grating based on polymer/liquid crystal composite material, and has both excellent optical properties and electro-optical responsiveness, gaining widespread attention in the industry and showing great commercial potential in optical waveguide-based AR display. In addition, compared with liquid crystal displays (Liquid Crystal Display, LCD) and organic light-emitting diodes (Organic Light-Emitting Diode, OLED), micro light-emitting diodes (Micro-LED) have advantages in terms of maximum brightness, resolution, ambient light contrast, power consumption, service life, response speed, thermal stability, and the like, and have become the mainstream image source for AR display. In the future, the combination of the polymer-dispersed liquid crystal volume holographic grating, that is, PDLC-VHG, and the micro light-emitting diode is expected to become the mainstream technical solution for AR optical waveguide display.

The ambient light contrast (Ambient Light Contrast, ACR) of diffractive optical waveguide display apparatuses is a critical performance parameter related to the display effect. The existing research indicates that when ACR>3, the image displayed is clear; when ACR>5, the image display effect is satisfactory; and when ACR>10, the display effect is outstanding (for details, refer to Light-Sci. Appl. 2021, 10, 216). The ACR is calculated as follows:

$$ACR = \frac{L_{in} * \eta_{in} * \eta_{out} + L_{AM} * T}{L_{AM} * T} \quad (1)$$

where $L_{in}$ and $L_{AM}$ are the in-coupling light intensity and the ambient light intensity respectively, $\eta_{in}$ and $\eta_{out}$ are the diffraction efficiencies of the in-coupling grating and the out-coupling grating respectively, and T is the transmittance of the waveguide lens. It can be learned from equation (1) that higher diffraction efficiencies of the in-coupling grating and the out-coupling grating mean higher ACR, indicating better display effect.

As shown in FIG. 4, the current PDLC-VHG generally has a high diffraction efficiency for the p-polarized light only but a low diffraction efficiency for the s-polarized light. This is because the liquid crystal molecules are generally arranged parallel to the grating vector direction (refer to Mater. Chem. Front. 2017, 1, 294; Composites Part B 2020, 199, 108290). As a result, when the PDLC-VHG is used in conjunction with the image source such as the micro light-emitting diode that emits unpolarized light, only the p-polarized light is coupled into the optical waveguide sheet and then coupled out to enter human eyes, while most of the s-polarized light directly passes through the optical waveguide sheet without being used (as shown in FIG. 3), leading to a low ACR. Therefore, it is necessary to develop an optical waveguide display apparatus that is insensitive to the polarization direction of the s-polarized light.

SUMMARY

The present invention is intended to provide a diffractive optical waveguide display apparatus that has high diffraction efficiencies for both s-polarized light and p-polarized light emitted by an image source and thus has high ambient light contrast, improving clarity at an exit end of a waveguide sheet. To achieve the foregoing invention objective, the technical solutions used in the present invention are as follows.

A diffractive optical waveguide display apparatus includes a diffraction grating, where the diffraction grating is provided with a waveguide sheet on one side, and the diffraction grating is provided with an image source on the other side, a beam emitted by the image source passing through the diffraction grating and entering the waveguide sheet, where the diffraction grating includes periodically distributed liquid crystal microcapsules, the liquid crystal microcapsules are hollow spheres with an inner diameter of 10 nm-60 nm and a surface thickness of 5 nm-30 nm, and the liquid crystal microcapsules are used to increase diffraction efficiencies for s-polarized light and p-polarized light, so that both the s-polarized light and the p-polarized light are able to undergo total internal reflection within the waveguide sheet, thereby improving clarity of an image output by the waveguide sheet.

Further, liquid crystal molecules within the liquid crystal microcapsules are all perpendicular to surface of the liquid crystal microcapsules and are distributed circumferentially around the liquid crystal microcapsules.

Further, directions of a number of liquid crystal microcapsules are distributed in a disordered manner, and directions of liquid crystal molecules within each of the liquid crystal microcapsules are parallel to each other.

Further, a number of liquid crystal microcapsule groups are provided in the diffraction grating, a number of liquid crystal microcapsules arranged side by side are provided in the liquid crystal microcapsule groups, and the number of liquid crystal microcapsule groups are arranged side by side in a length direction of the diffraction grating.

Further, an arrangement direction of the number of liquid crystal microcapsules within the liquid crystal microcapsule group is oblique to an emission direction of the image source.

Further, the diffraction grating further includes transparent substrates, where the liquid crystal microcapsules are disposed between two of the transparent substrates, a polymer is provided between the two transparent substrates, and the image source is incident on the transparent substrate on one side and exits from the transparent substrate on the other side, and then enters the waveguide sheet.

Further, the diffraction grating is provided in two, disposed at an incident end and exit end of the waveguide sheet respectively, and a direction in which the image source emits the beam directly faces the incident end of the waveguide sheet.

Further, the image source is a micro light-emitting diode.

Further, the clarity improved by the liquid crystal microcapsules is reflected in an ambient light contrast value.

Further, the liquid crystal microcapsules include a shell layer material, where the liquid crystal molecules are disposed in the shell layer material, and the shell layer material is formed by polymerizing acrylate monomers.

The present invention has the following beneficial effects.

1. When PDLC-VHG prepared by using a conventional holographic photopolymerization-induced phase separation method in the prior art is used as the diffraction grating, its optical waveguide-based AR display apparatus has a high diffraction efficiency for the p-polarized light only, resulting in low ambient light contrast and consequently low clarity. Compared with the PDLC-VHG, the diffraction grating used in the present invention has higher diffraction efficiencies for both the s-polarized light and p-polarized light emitted by the image source, and thus has higher ambient light contrast, improving the clarity at the exit end of the waveguide sheet.

2. In the diffraction grating of the present invention, the liquid crystal molecules are set to be perpendicular to the surface of the liquid crystal microcapsules and distributed circumferentially, or the directions of a number of liquid crystal microcapsules are distributed in a disordered manner and the directions of the liquid crystal molecules within each of the liquid crystal microcapsules are parallel to each other. No matter which of the foregoing methods is used, the multiple liquid crystal molecules and the incident direction of the image source always form an uncertain, disordered, and random angle. Therefore, the diffraction grating in the present invention, that is, PDLCC-VHG, is insensitive to a polarization direction of light.

3. With a Micro-LED as the image source, compared with LCD and OLED, the present invention has advantages in terms of maximum brightness, resolution, ambient light contrast, power consumption, service life, response speed, thermal stability, and the like.

4. In the present invention, the clarity of the image source being improved by increasing the ambient light contrast value can intuitively, specifically, and quantitatively improve the clarity of the image source. In actual production implementation, the ambient light contrast value can be specifically calculated to preliminarily estimate the clarity of the display products, thereby allowing for classification and production layout of the display products in advance based on the ambient light contrast value.

DETAILED DESCRIPTION OF EMBODIMENTS

The following clearly and completely describes the technical solutions in the embodiments of the present invention with reference to FIG. 1 to FIG. 4 in the embodiments of the present invention. Apparently, the described embodiments are merely some but not all of the embodiments of the present invention. Unless otherwise specified, the technical means used in the embodiments are conventional means well known to persons skilled in the art.

In the description of the present invention, it should be understood that the orientations or positional relationships indicated by the terms "longitudinal", "transverse", "upper", "lower", "front", "rear", "left", "right", "perpendicular", "horizontal", "top", "bottom", "inside", "outside", and the like are based on the orientations or positional relationships shown in the accompanying drawings. These terms are merely for ease of description of the present invention rather than indicating or implying that the apparatuses or elements mentioned must have specific orientations or must be constructed or manipulated according to specific orientations, and therefore shall not be construed as any limitations on the present invention.

Figure 1:
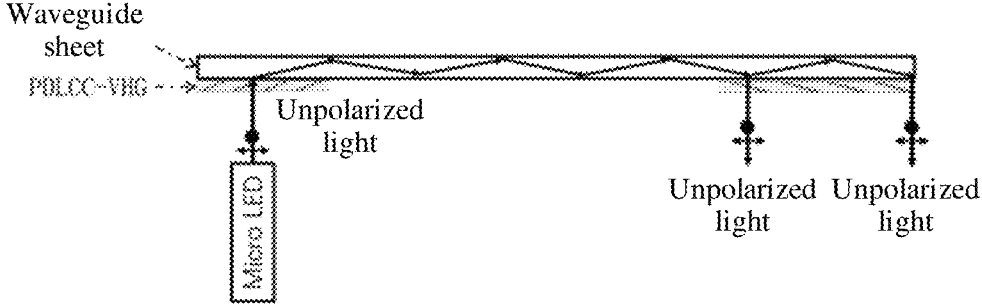
FIG. 1 is a schematic diagram of an overall structure of the present invention.

As shown in FIG. 1, a diffractive optical waveguide display apparatus includes a diffraction grating, where the diffraction grating is provided with a waveguide sheet on one side, and the diffraction grating is provided with an image source on the other side, a beam emitted by the image source passing through the diffraction grating and entering the waveguide sheet, where the diffraction grating includes periodically distributed liquid crystal microcapsules, and the liquid crystal microcapsules are used to increase diffraction efficiencies for s-polarized light and p-polarized light, so that both the s-polarized light and the p-polarized light are able to undergo total internal reflection within the waveguide sheet, thereby improving clarity of an image output by the waveguide sheet.

The waveguide sheet is a prior art used to conduct the image source. The beam emitted by the image source passes through the diffraction grating and enters the waveguide sheet. The diffraction grating, that is, PDLCC-VHG, a specific name given to an improved diffraction grating in the present invention, diffracts the beam between adjacent periodically distributed liquid crystal microcapsules after the beam is incident, effectively diffracting the s-polarized light and p-polarized light in the beam of the image source, thereby causing the beam of the image source to be incident on an incident end of the waveguide sheet at an oblique angle. As a result, the beam of the image source undergoes total internal reflection within the waveguide sheet and exits from an exit end of the waveguide sheet. Throughout the entire process, the diffraction grating effectively diffracts both the s-polarized light and p-polarized light in the image source, avoiding the loss of the beam of the image source caused by the s-polarized light directly entering and directly passing through the waveguide sheet and then exiting the waveguide sheet.

When PDLC-VHG prepared by using a conventional holographic photopolymerization-induced phase separation method in the prior art is used as the diffraction grating, its optical waveguide-based AR display apparatus has a high diffraction efficiency for the p-polarized light only, resulting in low ambient light contrast and consequently low final imaging clarity. Compared with the PDLC-VHG, the diffraction grating used in the present invention has higher diffraction efficiencies for both the s-polarized light and p-polarized light emitted by the image source, and thus has higher ambient light contrast, improving the clarity at the exit end of the waveguide sheet.

Figure 4:
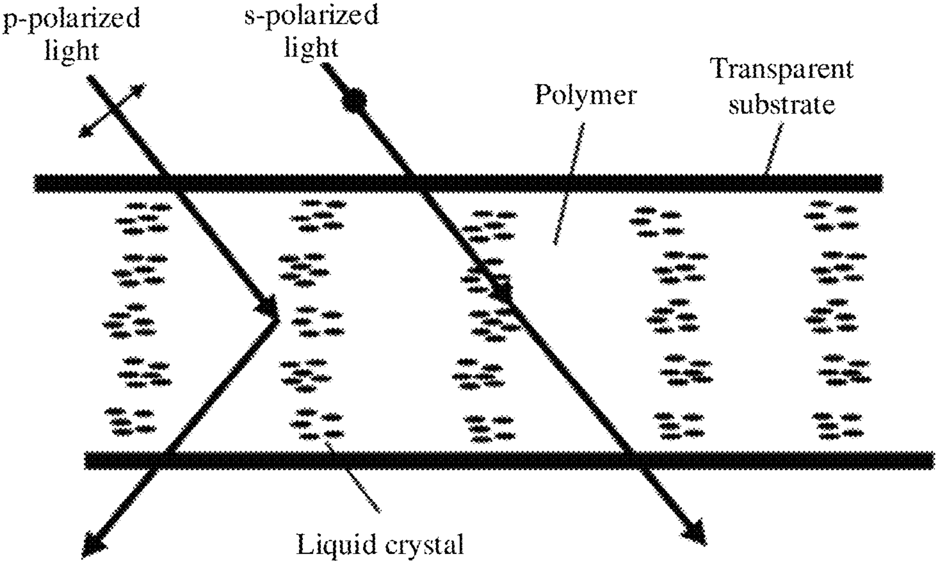
FIG. 4 is a schematic diagram of a diffraction grating in the prior art.

As shown in FIG. 4, the PDLC-VHG in the prior art is generally prepared through holographic photopolymerization-induced phase separation, so after the phase separation is completed, liquid crystal molecules are generally oriented along a grating vector direction, that is, along a direction parallel to length of the grating. The reasons for the orientation of the liquid crystal molecules along the grating vector direction are complex (refer to Annu. Rev. Mater. Sci. 2000, 30, 83), and the specific reasons are as follows.

1. The liquid crystal molecules are squeezed by anisotropic liquid crystal microdroplets.
2. The liquid crystal molecules are anchored perpendicular to an interface between a polymer and the liquid crystal.
3. Volume shrinkage during photopolymerization squeezes the liquid crystal microdroplets.

To avoid the fact that the PDLCC-VHG used in the present invention has the same orientation of liquid crystal molecules as the PDLC-VHG caused by the foregoing factors, during preparation of the PDLCC-VHG in the present invention, a shell layer material is first used to coat the liquid crystal molecules. The orientation of the coated liquid crystal molecules is not affected by external factors, thereby avoiding the orientation along the grating vector direction after holographic exposure.

For the liquid crystal microcapsules used in the present invention, the orientation of the liquid crystal molecules includes but is not limited to the following methods.

Figure 2:
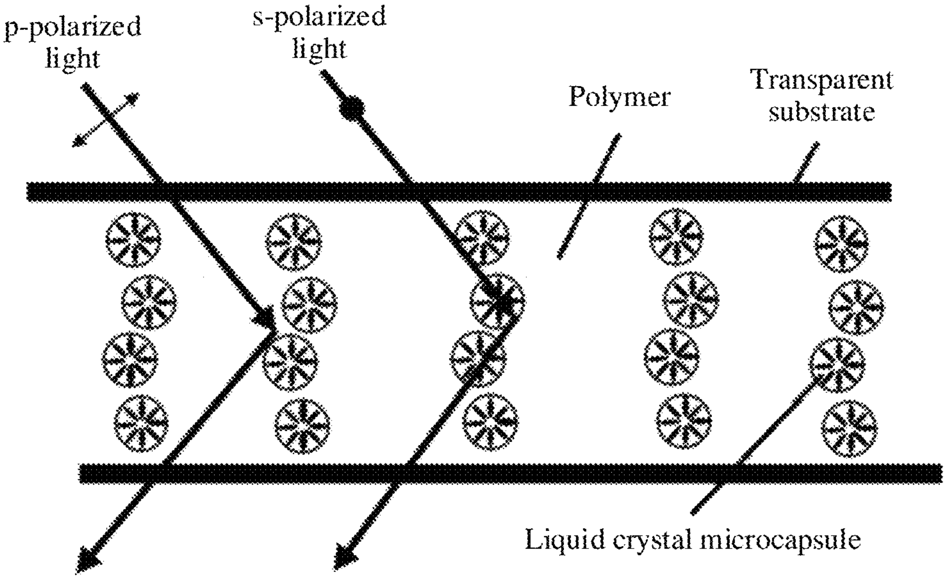
FIG. 2 is a schematic diagram of a diffraction grating of the present invention.
Figure 3:
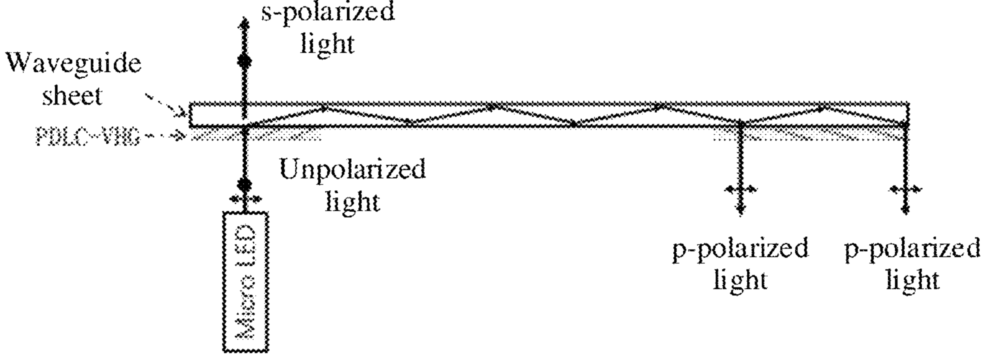
FIG. 3 is a schematic diagram of an optical waveguide display apparatus in the prior art.

One method, as shown in FIG. 2, is that liquid crystal molecules within the liquid crystal microcapsules are all perpendicular to surface of the liquid crystal microcapsules and are distributed circumferentially around the liquid crystal microcapsules. In other words, the liquid crystal molecules are disposed in a radial direction of the liquid crystal microcapsules, the liquid crystal molecules are oriented perpendicular to a capsule wall, and their defects are located at the center of the liquid crystal microcapsules. Such liquid crystal microcapsule has the same refractive index for light incident from all directions and thus has high diffraction efficiencies for both the s-polarized light and the p-polarized light.

The second orientation method is that directions of a number of liquid crystal microcapsules are distributed in a disordered and random manner, and directions of liquid crystal molecules within each of the liquid crystal microcapsules are parallel to each other. In each of the liquid crystal microcapsules, the liquid crystal molecules are oriented completely parallel to one direction, but the orientation of each liquid crystal microcapsule is disordered and random, so on a macroscopic scale, all the liquid crystal microcapsules remain isotropic and thus still have high diffraction efficiencies for both the s-polarized light and the p-polarized light.

In addition, another method can be used where a number of liquid crystal microcapsules and their internal liquid crystal molecules are all distributed in a completely disordered manner. In other words, the liquid crystal molecules within each of the liquid crystal microcapsules are distributed in a disordered and random manner, and the directions of all the liquid crystal microcapsules are also distributed in a disordered and random manner. This method, on a macroscopic scale, has the same principle as the foregoing second method. All the liquid crystal microcapsules remain isotropic and thus still have high diffraction efficiencies for both the s-polarized light and the p-polarized light.

In the present invention, no matter which of the foregoing methods is used, the multiple liquid crystal molecules and the incident direction of the image source always form an uncertain, disordered, and random angle. Therefore, the diffraction grating in the present invention, that is, the PDLCC-VHG, is insensitive to a polarization direction of light. Compared with the PDLC-VHG used in the prior art, the present invention significantly increases the diffraction efficiencies for the p-polarized light and the s-polarized light.

During specific preparation of the PDLCC-VHG in the present invention, the liquid crystal microcapsules can be mixed with photopolymerizable monomers and a photoinitiator, and then the mixture is subjected to holographic exposure, to prepare the polymer-dispersed liquid crystal microcapsule volume holographic grating, that is, the PDLCC-VHG.

Specifically, the liquid crystal microcapsules include a shell layer material, where the liquid crystal molecules are disposed in the shell layer material, and the shell layer material is formed by polymerizing acrylate monomers. The liquid crystal microcapsules can be prepared through emulsion polymerization. Specifically, a thermal initiator and a combination of monofunctional acrylate monomers and multifunctional acrylate monomers are used as a shell layer material precursor. After the liquid crystal is added, an oil-in-water fine emulsion is formed through phase inversion temperature emulsification with a block copolymer as a surfactant, and then heated to polymerize the acrylate monomers to form a shell layer, to prepare nano-sized liquid crystal microcapsules.

The arrangement of the liquid crystal molecules within the liquid crystal microcapsules can be regulated by changing a concentration of the surfactant. The principle is that the surfactant is mainly distributed in the polymer shell layer, which can promote the perpendicular anchoring of the liquid crystal molecules to the surface of the shell layer. For the liquid crystal microcapsules of the present invention, when the concentration of the surfactant is less than 2 wt %, the liquid crystal molecules are parallel to each other; and when the concentration of the surfactant is not less than 2 wt %, the liquid crystal molecules are distributed circumferentially, forming the distribution of the liquid crystal molecules in the present invention.

Specifically, the liquid crystal microcapsules are a hollow spherical structure, which can effectively diffract both the p-polarized light and s-polarized light in the image source in all directions, and facilitate the arrangement of the waveguide sheet and the image source in specific implementation, reducing precision requirements for the angle at which the image source emits the beam. The liquid crystal microcapsules have an inner diameter of 10 nm-60 nm and a surface thickness of 5 nm-30 nm, and the shell layer material is a crosslinked polymer material or an inorganic material.

In addition, the liquid crystal within the liquid crystal microcapsules is a nematic liquid crystal, with commercial brands including one of E7, THT-2, HH-02-1, HH-03-1, XEP-02-2, HH-04-4, HH-05-02, P36-9, P38-8, P36-204, P80-01, P42-1, and P92-1.

Further, a number of liquid crystal microcapsule groups are provided in the diffraction grating, a number of liquid crystal microcapsules arranged side by side are provided in the liquid crystal microcapsule groups, and the number of liquid crystal microcapsule groups are arranged side by side in a length direction of the diffraction grating.

As shown in FIG. 2, in the horizontal direction in the figure, that is, in the length direction of the diffraction grating, a number of liquid crystal microcapsule groups are arranged side by side and periodically, a gap is present between two adjacent liquid crystal microcapsule groups, and each of the liquid crystal microcapsule groups includes a number of liquid crystal microcapsules arranged side by side and periodically in the vertical direction in FIG. 2.

Further, an arrangement direction of the number of liquid crystal microcapsules within the liquid crystal microcapsule group is oblique to an emission direction of the image source.

Specifically, the beam of the image source is incident on the diffraction grating at an oblique angle, and the arrangement direction of the liquid crystal microcapsules within each of the liquid crystal microcapsule groups may be set to be oblique to the direction of the beam of the image source.

Further, the diffraction grating further includes transparent substrates, where the liquid crystal microcapsules are disposed between two of the transparent substrates, a polymer is provided between the two transparent substrates, and the image source is incident on the transparent substrate on one side and exits from the transparent substrate on the other side, and then enters the waveguide sheet.

Specifically, both the transparent substrates and the polymer are prior arts, and the beam emitted by the image source can pass through the transparent substrates and the polymer. An overall thickness of the diffraction grating is 2 μm-50 μm, a grating period is 500 nm-10 μm, a refractive index of the polymer matrix is 1.40-1.60, and a ratio of diffraction efficiencies of the diffraction grating for the p-polarized light and the s-polarized light is 1.1:1.0-1.0:1.1.

Further, the diffraction grating is provided in two, disposed at an incident end and exit end of the waveguide sheet respectively, and a direction in which the image source emits the beam directly faces the incident end of the waveguide sheet.

Specifically, an end where the beam emitted by the image source enters the waveguide sheet is the incident end of the waveguide sheet, and an end of the waveguide sheet facing away from the incident end is the exit end.

As shown in FIG. 1, the specific arrangement of the overall structure of the present invention is as follows.

The incident end and exit end of the waveguide sheet are provided with two diffraction gratings, that is, the PDLCC-VHG, respectively, the waveguide sheet is parallel to the diffraction gratings, and the two diffraction gratings are arranged side by side on a same side of the waveguide sheet. A number of liquid crystal microcapsule groups within the diffraction grating are distributed in a direction parallel to the waveguide sheet, the liquid crystal microcapsules within each of the liquid crystal microcapsule groups are arranged oblique to the direction of the beam of the image source, and the emission direction of the beam of the image source is perpendicular to the waveguide sheet.

In addition, the liquid crystal microcapsules within the two diffraction gratings are symmetrically arranged, which can effectively output the beam of the image source from the exit end of the waveguide sheet.

Further, the image source is a Micro-LED. Compared with LCD and OLED, the Micro-LED has advantages in terms of maximum brightness, resolution, ambient light contrast, power consumption, service life, response speed, thermal stability, and the like, and has become the mainstream image source for AR display. No matter which of the foregoing image sources or an image source unmentioned is used, the present invention can improve the clarity of the image finally output.

Further, the clarity improved by the liquid crystal microcapsules is reflected in an ambient light contrast value.

Because the ambient light contrast value, that is, ACR value, is closely related to the image display effect, and the ACR value directly correlates with diffraction efficiencies of an in-coupling grating and an out-coupling grating, so the imaging clarity of the image source being determined based on the ACR value can intuitively, specifically, and quantitatively determine the imaging effects. In actual production implementation, the ACR value can be specifically calculated to preliminarily estimate the clarity of the display products, thereby allowing for classification and production layout of the display products in advance based on the ACR value.

The following uses specific comparison of two experimental data to specifically describe the specific significant improvements achieved by the diffraction grating, that is, the PDLCC-VHG, in the present invention, compared with the PDLC-VHG in the prior art.

Example

This example used the diffraction grating, that is, the PDLCC-VHG, in the present invention.

A diffractive optical waveguide apparatus included a Micro-LED image source, a PDLCC-VHG in-coupling grating, a PDLCC-VHG out-coupling grating, and a waveguide sheet.

As shown in FIG. 1, the image displayed by the Micro-LED image source was coupled into the waveguide sheet at the incident end through the PDLCC-VHG, with an in-coupling light brightness of 1200 nit. After undergoing total internal reflection within the waveguide sheet, the image was coupled out of the waveguide sheet at the exit end through the PDLCC-VHG.

A thickness of the PDLCC-VHG used was 10 μm, a grating period was 800 nm, a refractive index of the polymer matrix was 1.50, an inner diameter of the liquid crystal microcapsules was 30 nm, a thickness of the shell layer was 10 nm, the shell layer material was crosslinked polyacrylate, and the liquid crystal was THT-2.

The diffraction efficiencies of the PDLCC-VHG for the s-polarized light and the p-polarized light were 88% and 89% respectively.

The grating has different diffraction efficiencies for different polarized lights, so when the ACR was calculated, equation (1) needed to be rewritten as:

$$ACR = \frac{L_{ins} * \eta_{ins} * \eta_{outs} + L_{inp} * \eta_{inp} * \eta_{outp} + L_{AM} * T}{L_{AM} * T} \quad (2)$$

where $L_{ins}$ and $L_{inp}$ were brightnesses of the s-polarized light and the p-polarized light respectively, and for the Micro-LED image source, $L_{ins}=L_{inp}$; and $\eta_{ins}$ and $\eta_{outs}$ were diffraction efficiencies of the in-coupling grating and the out-coupling grating for the s-polarized light respectively, and $\eta_{inp}$ and $\eta_{outp}$ were diffraction efficiencies of the in-coupling grating and the out-coupling grating for the p-polarized light respectively.

According to equation (2), when an ambient light brightness was 300 nit and a transmittance of the optical waveguide sheet was 90%, the ACR of this example was 4.5, indicating a clear display effect.

Comparative Example

This comparative example used the diffraction grating, that is, the PDLC-VHG, in the prior art.

A diffractive optical waveguide apparatus included a Micro-LED image source, a PDLC-VHG in-coupling grating, a PDLC-VHG out-coupling grating, and a waveguide sheet.

The image displayed by the Micro-LED image source was coupled into the waveguide sheet at the incident end through the PDLC-VHG, with an in-coupling light brightness of 1200 nit. After undergoing total internal reflection within the waveguide sheet, the image was coupled out of the waveguide sheet at the exit end through the PDLC-VHG.

A thickness of the PDLC-VHG used was 10 μm, a grating period was 800 nm, a refractive index of the polymer matrix was 1.50, and the liquid crystal was E7.

The diffraction efficiencies of the PDLC-VHG for the s-polarized light and the p-polarized light were 25% and 89% respectively. According to equation (2), when an ambient light brightness was 300 nit and a transmittance of the optical waveguide sheet was 90%, the ACR was 2.9, indicating that the display effect did not meet the clarity standard.

It can be learned from comparison between the foregoing example and comparative example that as compared with the prior art, under the same image source, grating thickness, grating period, refractive index of the polymer matrix, liquid crystal type, ambient light brightness, transmittance of the optical waveguide sheet, and other environmental factors, the ACR value of the image source finally output in the present invention is much greater than the ACR value in the prior art, indicating that the image output in the present invention is much clearer than the image output in the prior art. Therefore, the diffraction grating in the present invention significantly improves the clarity of the image output by the image source.

The specific and complete workflow of the present invention is as follows.

As shown in FIG. 1 and FIG. 2, a Micro-LED image source emits a beam, and the beam first enters a diffraction grating, that is, PDLCC-VHG. When s-polarized light and p-polarized light in the beam pass through the diffraction grating, the beam between two adjacent liquid crystal microcapsule groups undergoes diffraction, causing the s-polarized light and the p-polarized light to be incident on an incident end of a waveguide sheet at an oblique angle, undergo total internal reflection within the waveguide sheet, and finally be output from a diffraction grating at an exit end of the waveguide sheet. Throughout the process, both the s-polarized light and the p-polarized light are effectively diffracted, avoiding the loss of the s-polarized light and improving the clarity of the image output.

The foregoing embodiments are merely described as preferred embodiments of the present invention, and do not limit the scope of the present invention. Various changes, variations, modifications, and substitutions made by persons of ordinary skill in the art to the technical solutions of the present invention without departing from the design spirit of the present invention shall fall within the protection scope determined by the claims of the present invention.

In conclusion, it should be noted that the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some or all of the technical features thereof, without departing from the scope of the technical solutions in the embodiments of this application.

What is claimed is:

1. A diffractive optical waveguide display apparatus, comprising: a diffraction grating, wherein the diffraction grating is provided with a waveguide sheet on one side, and the diffraction grating is provided with an image source on the other side, a beam emitted by the image source passing through the diffraction grating and entering the waveguide sheet, wherein the diffraction grating comprises periodically distributed liquid crystal microcapsules, the liquid crystal microcapsules are hollow spheres with an inner diameter of 10 nm-60 nm and a surface thickness of 5 nm-30 nm, and the liquid crystal microcapsules are used to increase diffraction efficiencies for s-polarized light and p-polarized light, so that both the s-polarized light and the p-polarized light are able to undergo total internal reflection within the waveguide sheet, thereby improving clarity of an image output by the waveguide sheet.

2. The diffractive optical waveguide display apparatus according to claim 1, wherein liquid crystal molecules within the liquid crystal microcapsules are all perpendicular to surface of the liquid crystal microcapsules and are distributed circumferentially around the liquid crystal microcapsules.

3. The diffractive optical waveguide display apparatus according to claim 1, wherein directions of a number of liquid crystal microcapsules are distributed in a disordered manner, and directions of liquid crystal molecules within each of the liquid crystal microcapsules are parallel to each other.

4. The diffractive optical waveguide display apparatus according to claim 1, wherein a number of liquid crystal microcapsule groups are provided in the diffraction grating, wherein the number of liquid crystal microcapsule groups are arranged side by side in a length direction of the diffraction grating, and each of the liquid crystal microcapsule groups comprises a number of liquid crystal microcapsules arranged side by side.

5. The diffractive optical waveguide display apparatus according to claim 4, wherein an arrangement direction of the number of liquid crystal microcapsules within the liquid crystal microcapsule group is oblique to an emission direction of the image source.

6. The diffractive optical waveguide display apparatus according to claim 4, wherein the diffraction grating further comprises transparent substrates, wherein the liquid crystal microcapsules are disposed between two of the transparent substrates, a polymer is provided between the two transparent substrates, and the image source is incident on the transparent substrate on one side and exits from the transparent substrate on the other side, and then enters the waveguide sheet.

7. The diffractive optical waveguide display apparatus according to claim 1, wherein the diffraction grating is provided in two, disposed at an incident end and exit end of the waveguide sheet respectively, and a direction in which the image source emits the beam directly faces the incident end of the waveguide sheet.

8. The diffractive optical waveguide display apparatus according to claim 1, wherein the image source is a micro light-emitting diode.

9. The diffractive optical waveguide display apparatus according to claim 1, wherein the clarity improved by the liquid crystal microcapsules is reflected in an ambient light contrast value.

10. The diffractive optical waveguide display apparatus according to claim 2, wherein the liquid crystal microcapsules comprise a shell layer material, wherein the liquid crystal molecules are disposed in the shell layer material, and the shell layer material is formed by polymerizing acrylate monomers.

* * * * *